United States Patent [19]

Tagawa

[11] Patent Number: 4,699,426
[45] Date of Patent: Oct. 13, 1987

[54] VEHICLE SEAT

[75] Inventor: Yuji Tagawa, Ayase, Japan

[73] Assignee: Ikeda Bussan Co., Ltd., Kanagawa, Japan

[21] Appl. No.: 841,220

[22] Filed: Mar. 19, 1986

[30] Foreign Application Priority Data

Mar. 28, 1985 [JP] Japan .............................. 60-43783[U]

[51] Int. Cl.⁴ .............................................. B60N 1/02
[52] U.S. Cl. .................................... 297/378; 297/219
[58] Field of Search .............. 297/378, 379, 354, 355, 297/219; 296/65 R, 63, 67

[56] References Cited

U.S. PATENT DOCUMENTS

| | | | |
|---|---|---|---|
| 1,951,674 | 3/1934 | Saunders | 297/378 X |
| 2,575,548 | 11/1951 | Carter et al. | 297/378 X |
| 2,673,593 | 3/1954 | Hendrickson | 297/378 X |
| 3,226,157 | 12/1965 | Reinfeldt et al. | 297/378 X |
| 3,259,433 | 7/1966 | Werner | 297/379 X |
| 4,103,964 | 8/1978 | Klingelhofer et al. | 297/379 X |
| 4,382,630 | 5/1983 | Weston | 297/379 X |
| 4,579,384 | 4/1986 | Sharod | 297/379 X |

FOREIGN PATENT DOCUMENTS 2055958  3/1981  United Kingdom ............... 297/378

Primary Examiner—Kenneth J. Dorner
Assistant Examiner—Mark W. Binder
Attorney, Agent, or Firm—Schwartz, Jeffery, Schwaab, Mack, Blumenthal & Evans

[57] ABSTRACT

A vehicle seat whose seat back can be collapsed forward in relation to the seat cushion and wherein the projected upper end of a bracket located on the side of the seat cushion is covered by a hinge cover made of synthetic resin to separate the projected end of a bolt from the side of the seat back, so that the surface cover material on the seat back can be prevented from breaking because of the direct contact between the front end of the bolt and the side of the seat back.

7 Claims, 3 Drawing Figures

VEHICLE SEAT

BACKGROUND OF THE INVENTION (a) Field of the Invention

The present invention relates to a vehicle seat and more particularly, it relates to a vehicle seat whose seat back can be collapsed forward.

(b) Prior Art

FIG. 1 is a side view showing one of the conventional vehicle seats. A seat cushion (a) is connected to a seat back (b) through a hinge fulcrum (c) which is located at the back end side of the seat cushion (a), and the seat back (b) can be collapsed forward around the hinge fulcrum (c).

When the seat back (b) is inclined forward, taking the hinge fulcrum (c) as its center, the lower rim portion of the seat back (b) is contacted with the upper surface of the seat cushion (a), thereby limiting the angle, to which the seat back (b) can be inclined forward, to a certain value ($a$) in the case of this vehicle seat.

If the hinge fulcrum is located at a position (c1) in FIG. 1, the seat back (b) can be completely collapsed onto the upper surface of the seat cushion (a).

What is the most troublesome in the case of the structure of this conventional vehicle seat is that brackets located on the side of the seat back must be left exposed and that the surface cover material of the seat back is likely to be broken when the seat back is repeatedly collapsed because the foremost ends of those bolts which are located at the hinge fulcrum and which are screwed into the brackets from outside are contacted with the lower end side rim portion of the seat back.

SUMMARY OF THE INVENTION

The present invention is therefore intended to eliminate the above-mentioned drawbacks.

Accordingly, the object of the present invention is to provide a vehicle seat whose seat back can be completely collapsed onto the seat cushion, wherein nuts and the upper projected ends of brackets are covered by hinge covers made of synthetic resin and wherein a hinge cover is interposed between the projected end of a bolt and the side of the seat back.

When the vehicle seat is made like this, there is no possibility that the surface cover material of the seat back is broken when the seat back is repeatedly collapsed, because it is the smooth hinge cover made of synthetic resin that is contacted with the side of the seat back. This therefore contributes to making the vehicle seat more durable.

DETAILED DESCRIPTION OF THE PREFERRED EMBODIMENT

Figure 1:
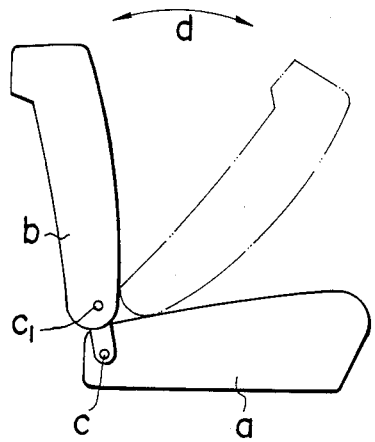
FIG. 1 is a side view showing one of the conventional vehicle seats.
Figure 2:
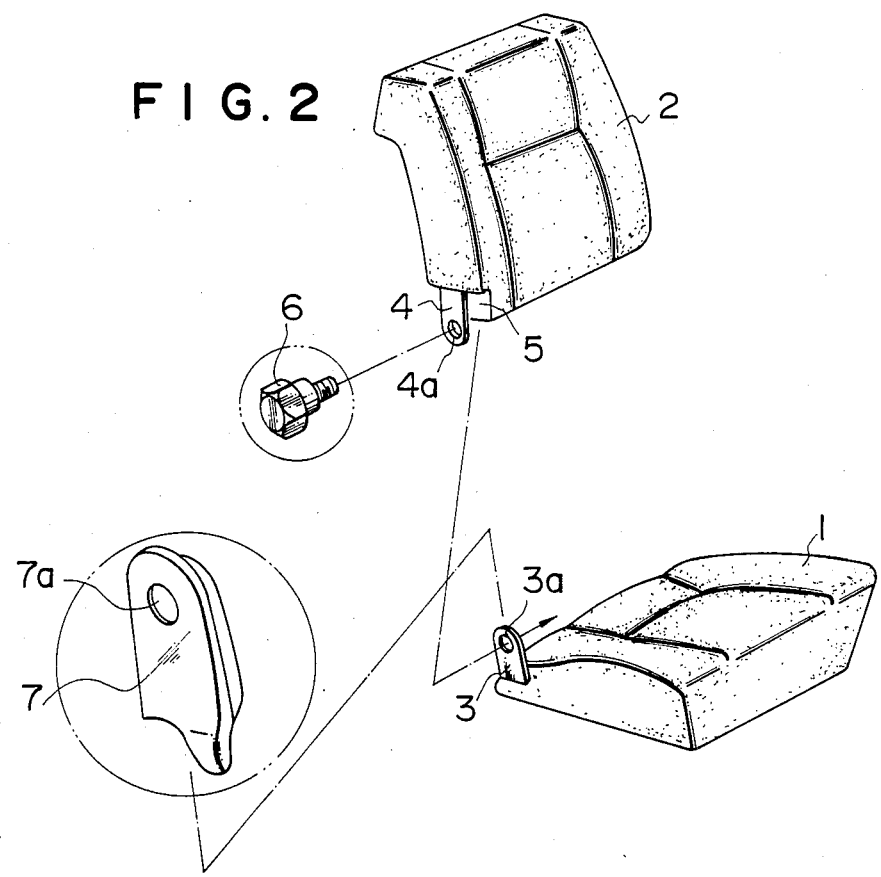
FIG. 2 is a perspective view showing a vehicle seat of the present invention developed and partly enlarged.

In FIGS. 1 and 2, reference numeral 1 represents a seat cushion and 2 a seat back.

A bracket 3 is projected upward from the back end side of the seat cushion 1. Another bracket 4 which is engaged with the bracket 3 is also projected from the lower end side of the seat back 2. A cut-away portion or recess 5 which corresponds to these projected portions of the brackets 3 and 4 is formed at a lower end corner of the seat back 2. A bolt 6 is inserted into holes 3a and 4a of the brackets 3 and 4 and screwed into a nut 3b which is fixed by welding to the inner side of the bracket 3 located on the side of the seat cushion. The bolt 6 includes a spacer portion 6a and a threaded portion 6b extending from the foremost end of the spacer portion 6a. When the bolt 6 is screwed into the nut 3b, the bracket 4 is held swingable in relation to the bracket 3.

A hinge cover 7 is attached to the projected upper end of the bracket 3 which is located on the side of the seat cushion 1. The hinge cover 7 is provided with a hole 7a through which the bolt 6 is inserted, and after the hinge cover 7 is fitted onto the bracket 3 and then embedded into the seat cushion 1, it is connected to the bracket 4 through the bolt 6.

The hinge cover 7 is made of a smooth synthetic resin material such as polypropylene, nylon and ABS and injection- or blow-molded like a sack or box having an opening at the lower end thereof. When the hinge cover 7 is fitted onto the bracket 3 and then embedded into the seat cushion 1 by a certain depth, the holes 7a and 3a are aligned each other enabling the bolt 6 to be inserted through them.

In the case of this vehicle seat, therefore, the hinge fulcrum which was conventionally located as shown in FIG. 1 can be shifted to the position c1 higher than the upper surface of the seat cushion 1, thereby making it possible to completely collapse the seat back 2 onto the upper surface of the seat cushion 1.

Figure 3:
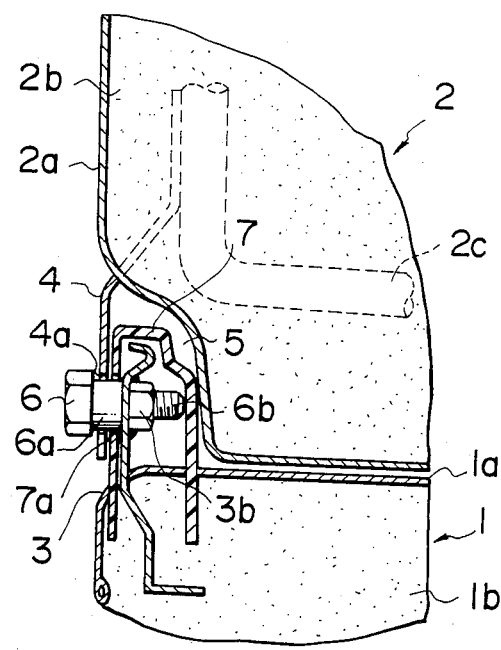
FIG. 3 is a sectional view showing a part of the vehicle seat assembled.

As shown in FIG. 3, the hinge cover 7 is located in the cut-away portion 5 to completely separate the foremost end of the bolt 6 from direct contact with the surface cover material 2a on the seat back 2. Even when the seat back 2 is repeatedly collapsed, therefore, it is the synthetic resin-made hinge cover that is contacted with the surface of the cover material 2a in the cut-away portion 5, thereby preventing the surface cover material 2a from being broken by the direct contact between the bolt 6 and the surface cover material 2a.

In FIG. 3 reference numeral 2b denotes a pad material in the seat back 2 and 2c a back frame. The seat cushion 1 also includes its frame, a cushion pad 1b and a surface material 1a.

What is claimed is:

1. A vehicle seat comprising:
   a seat cushion;
   a seat back;
   means for pivotally connecting said seat back and said cushion so that said seat back is forwardly inclinable, said pivotal connecting means comprising:
   a first bracket having an upper end portion extending upwardly from a back end side portion of said seat cushion;
   nut means affixed at said upper end portion of said first bracket;
   a second bracket extending downwardly from a lower end side portion of said seat back, said second bracket having an opening aligned with said nut means;
   a hinge cover constructed from synthetic resin, said hinge cover including a first side portion adjacent said seat back and an outer side portion remote from said seat back, said outer side portion provided with a hole aligned with said nut means; and a bolt extending inwardly through said opening and said hole and threaded into said nut, a threaded end portion of said bolt extending toward said seat back, said first side portion of said hinge cover interposed between said bolt end portion and said seat back, whereby an area of the seat back adjacent said bolt end portion is protected from damage during pivoting of said seat back and whereby during assembly of the vehicle seat, said bolt may be inserted through said opening and said hole so as to facilitate production.

2. The vehicle seat according to claim 1, wherein the bolt is located above an upper surface of the seat cushion.

3. The vehicle seat according to claim 1, wherein the hinge cover is box-like in shape, with an open lower end portion located adjacent said seat cushion.

4. The vehicle seat according to claim 1, wherein said lower end side portion of said seat back is inwardly recessed; said first and second brackets, said bolt and said hinge cover located in a space provided by said recessed lower end portion.

5. The vehicle seat according to claim 4, wherein said first and remote side portion of said hinge cover are disposed at opposite sides of said upper end portion of said first bracket, said hinge cover including a third upper portion extending over said upper end portion of said first bracket and connecting said first and remote side portions, said hinge cover interposed between a lower portion of said second bracket and said seat back.

6. The vehicle seat according to claim 5, wherein said synthetic resin is selected from a group consisting of polypropylene, nylon and ABS.

7. The vehicle seat according to claim 6, wherein said bolt is located above an upper surface of said seat cushion.

* * * * *